(12) United States Patent
Lahti et al.

(10) Patent No.: US 10,864,593 B2
(45) Date of Patent: Dec. 15, 2020

(54) WIRE FEEDER FOR WELDING

(71) Applicant: Illinois Tool Works Inc., Glenview, IL (US)

(72) Inventors: Thomas D. Lahti, Combined Locks, WI (US); Richard Beeson, Appleton, WI (US); William Giese, Monee, IL (US); Erik Miller, Madison, WI (US)

(73) Assignee: Illinois Tool Works Inc., Glenview, IL (US)

( * ) Notice: Subject to any disclaimer, the term of this patent is extended or adjusted under 35 U.S.C. 154(b) by 30 days.

(21) Appl. No.: 15/293,773

(22) Filed: Oct. 14, 2016

(65) Prior Publication Data

US 2017/0136567 A1   May 18, 2017

Related U.S. Application Data

(63) Continuation-in-part of application No. 14/943,249, filed on Nov. 17, 2015.
(Continued)

(51) Int. Cl.
*B23K 9/133*   (2006.01)
*B23K 9/12*    (2006.01)
(Continued)

(52) U.S. Cl.
CPC ......... *B23K 9/1336* (2013.01); *B23K 9/125* (2013.01); *B65H 51/10* (2013.01); *F16D 7/025* (2013.01); *B65H 2701/36* (2013.01)

(58) Field of Classification Search
None
See application file for complete search history.

(56) References Cited

U.S. PATENT DOCUMENTS

| | | |
|---|---|---|
| 1,541,582 A | 6/1925 | Merrill |
| 3,293,477 A | 12/1966 | Lobosco |
| (Continued) | | |

FOREIGN PATENT DOCUMENTS

| | | |
|---|---|---|
| CN | 1247358 | 3/2000 |
| CN | 102905834 | 1/2013 |
| (Continued) | | |

OTHER PUBLICATIONS

European Search Report for EP 16189481 dated Jan. 3, 2017 (4 pages).
(Continued)

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

A wire conveying mechanism, preferably for a welding, cladding or additive manufacturing apparatus, with a slip clutch mechanism connectable to a motor. Such a wire conveying mechanism may include a wire feeder for feeding an electrode wire in a welding system having a drive roller assembly comprising a plurality of drive rollers to grip the electrode wire and to pull the electrode wire from an electrode wire source toward a conduit and a torque-managing device operatively coupled between a motor and the drive roller assembly, wherein the torque-managing device receives the rotational force from the first motor and regulates the first torque to output a second torque to the drive roller assembly.

23 Claims, 14 Drawing Sheets

Related U.S. Application Data

(60) Provisional application No. 62/322,933, filed on Apr. 15, 2016.

(51) Int. Cl.
   *F16D 7/02* (2006.01)
   *B65H 51/10* (2006.01)

(56) References Cited

U.S. PATENT DOCUMENTS

| | | | | |
|---|---|---|---|---|
| 3,546,423 A | | 12/1970 | Chopp | |
| 3,553,423 A | * | 1/1971 | Doxey | B23K 9/1336 |
| | | | | 219/137.7 |
| 3,562,577 A | | 2/1971 | Kensrue | |
| 3,596,042 A | * | 7/1971 | Volk | B23K 11/002 |
| | | | | 219/80 |
| 3,630,425 A | * | 12/1971 | Wilkens | B23K 9/1336 |
| | | | | 226/108 |
| 3,644,701 A | * | 2/1972 | Kobayashi | B23K 9/1336 |
| | | | | 219/137.7 |
| 3,873,798 A | * | 3/1975 | Friedman | B23K 9/0286 |
| | | | | 219/125.11 |
| 4,107,508 A | * | 8/1978 | Izumi | B23K 9/1336 |
| | | | | 219/137.7 |
| 4,954,690 A | * | 9/1990 | Kensrue | B23K 9/12 |
| | | | | 219/137.31 |
| 5,449,118 A | * | 9/1995 | Baker | B05B 7/203 |
| | | | | 226/42 |
| 5,521,355 A | * | 5/1996 | Lorentzen | B23K 9/1336 |
| | | | | 219/137.61 |
| 5,811,750 A | * | 9/1998 | Caprioglio | B23K 11/309 |
| | | | | 219/81 |
| 5,973,291 A | * | 10/1999 | Kramer | B23K 9/125 |
| | | | | 219/130.01 |
| 6,903,305 B2 | * | 6/2005 | Mukai | B23K 9/1336 |
| | | | | 219/137.7 |
| 8,342,150 B2 | * | 1/2013 | Renner | B66C 23/42 |
| | | | | 123/350 |
| 8,604,386 B2 | | 12/2013 | Mehn | |
| 8,878,097 B2 | * | 11/2014 | Enyedy | B23K 9/1336 |
| | | | | 219/137.2 |
| 9,029,734 B2 | * | 5/2015 | Peters | B65H 51/10 |
| | | | | 219/124.01 |
| 9,284,138 B2 | * | 3/2016 | Hino | B65H 3/0669 |
| 9,586,283 B2 | * | 3/2017 | Romenesko | B23K 9/1336 |
| 10,315,269 B2 | * | 6/2019 | Christopher | B23K 9/32 |
| 10,343,231 B2 | * | 7/2019 | Gelmetti | B23K 9/133 |
| 2004/0011776 A1 | | 1/2004 | Mukai | |
| 2006/0163230 A1 | | 7/2006 | Kaufman | |
| 2008/0217313 A1 | | 9/2008 | Huismann et al. | |
| 2011/0114613 A1 | | 5/2011 | Ihde et al. | |
| 2013/0180971 A1 | | 7/2013 | Peters | |
| 2013/0327754 A1 | | 12/2013 | Salsich et al. | |
| 2014/0054349 A1 | | 2/2014 | Lahti et al. | |
| 2014/0061178 A1 | | 3/2014 | Matiash et al. | |

FOREIGN PATENT DOCUMENTS

| | | |
|---|---|---|
| EP | 2949416 | 11/2016 |
| GB | 232995 | 10/1925 |
| JP | 2006281226 | 10/2006 |

OTHER PUBLICATIONS

International Search Report & Written Opinion for application No. PCT/US2016/057913 dated Jan. 16, 2017.

* cited by examiner

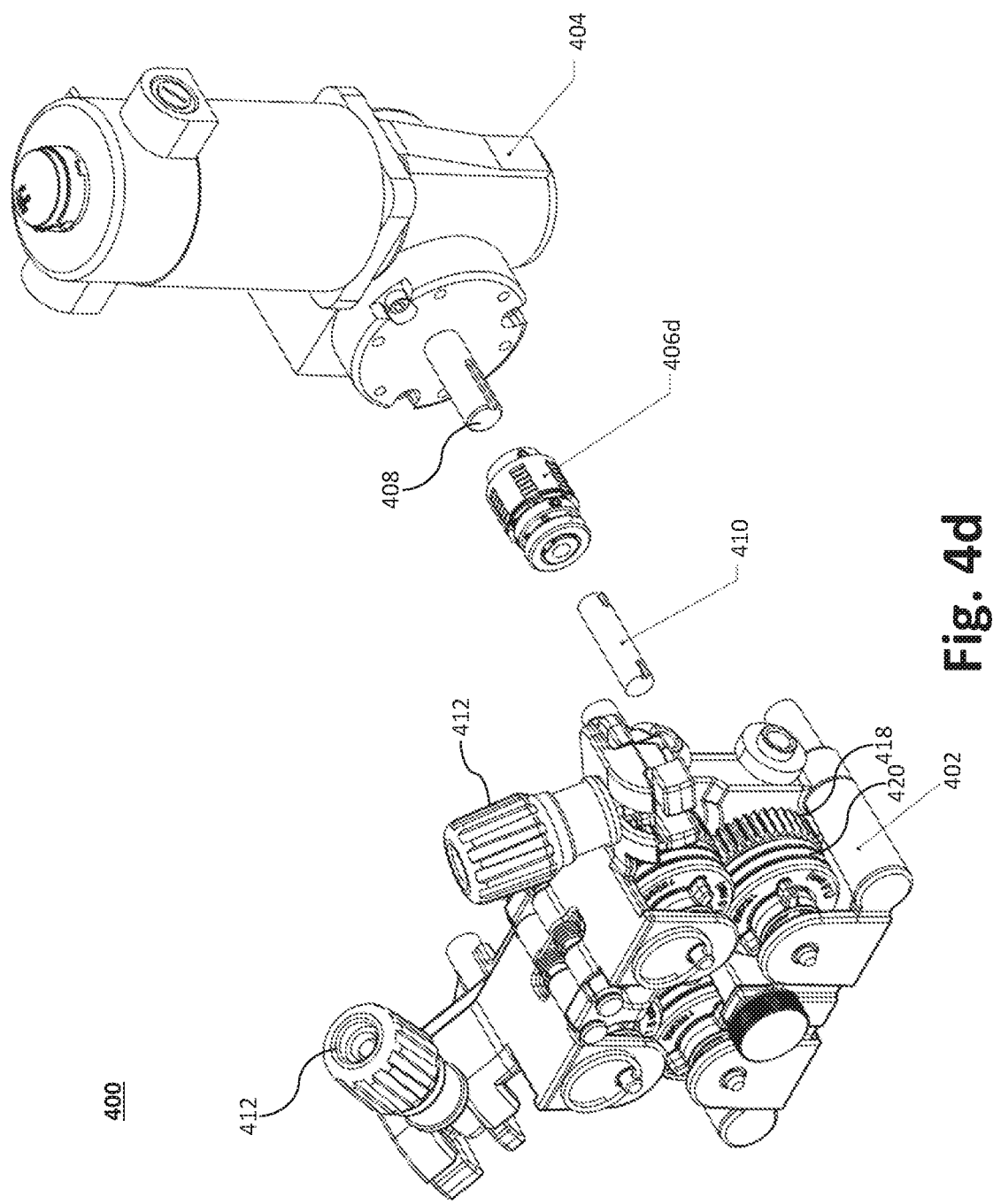

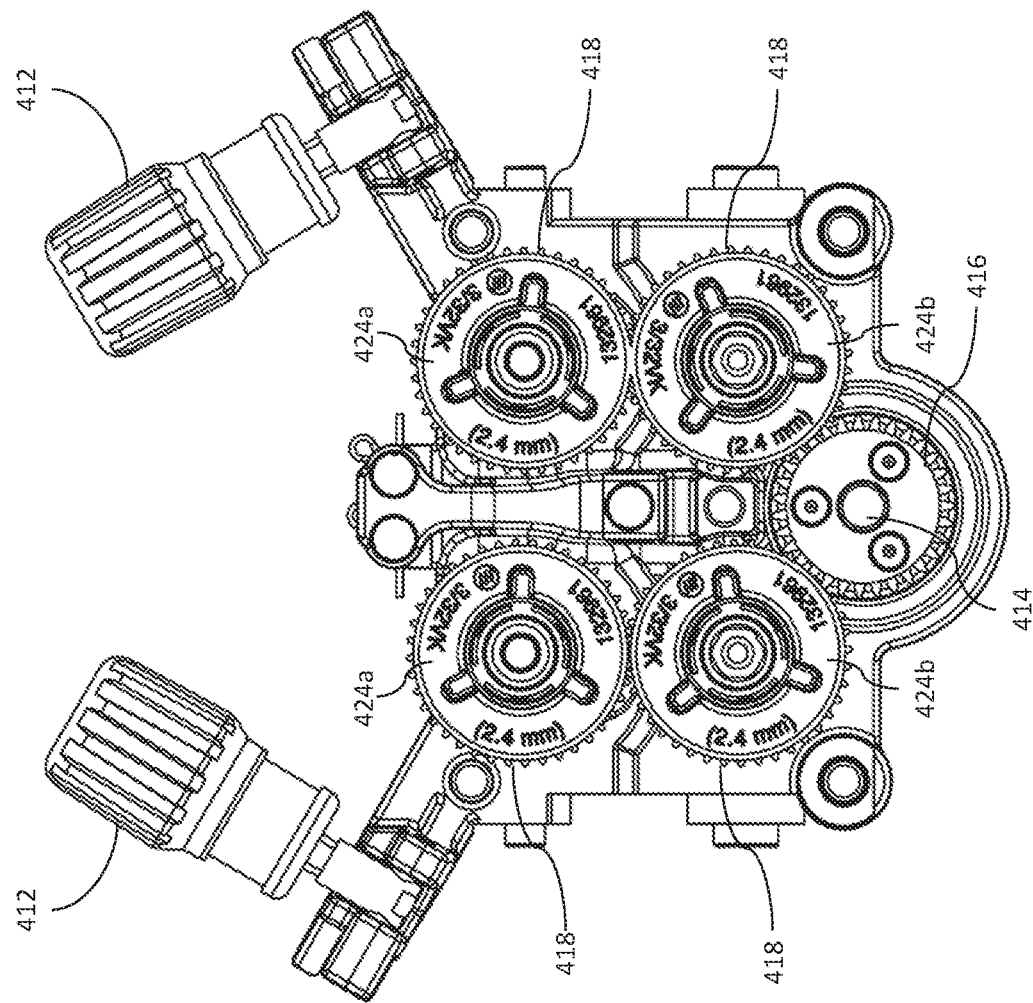

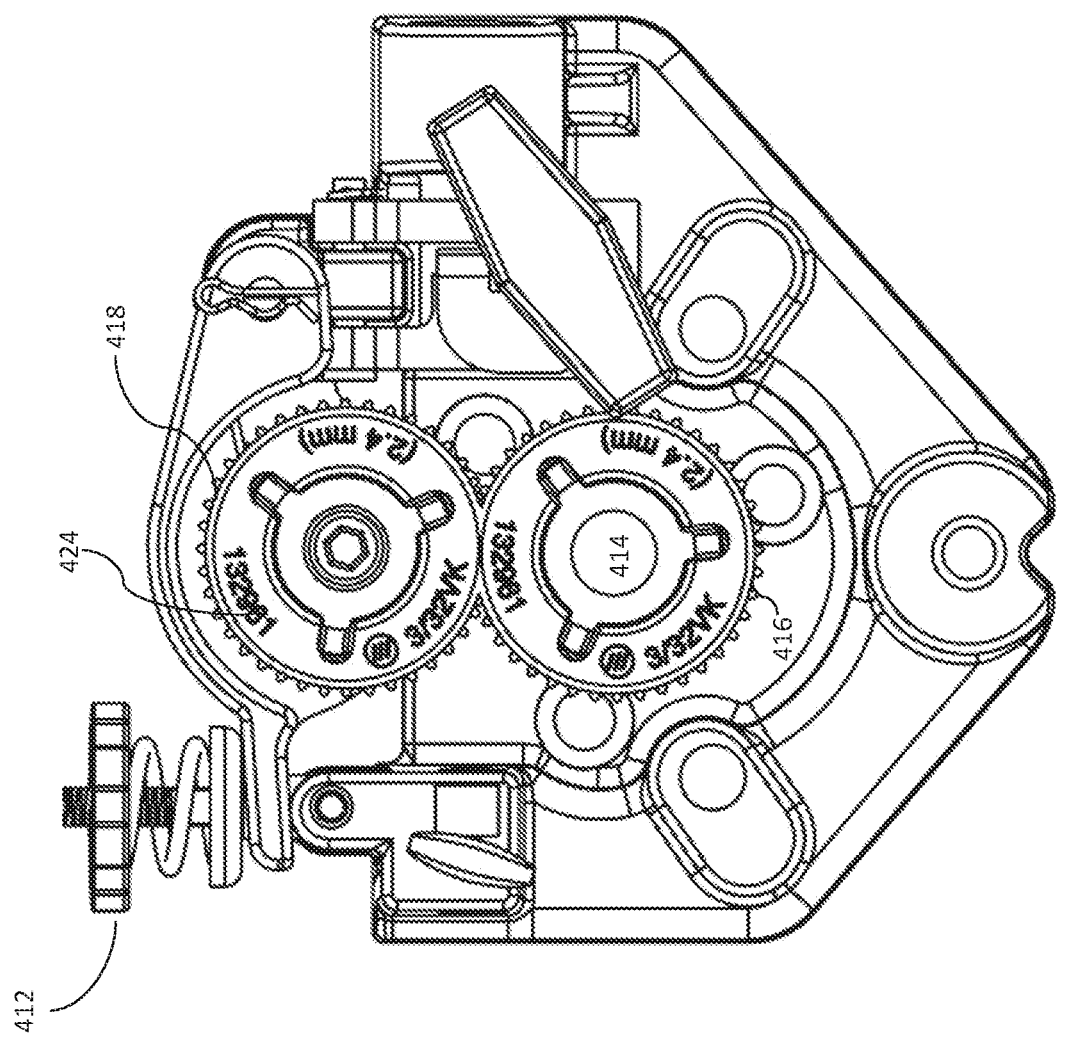

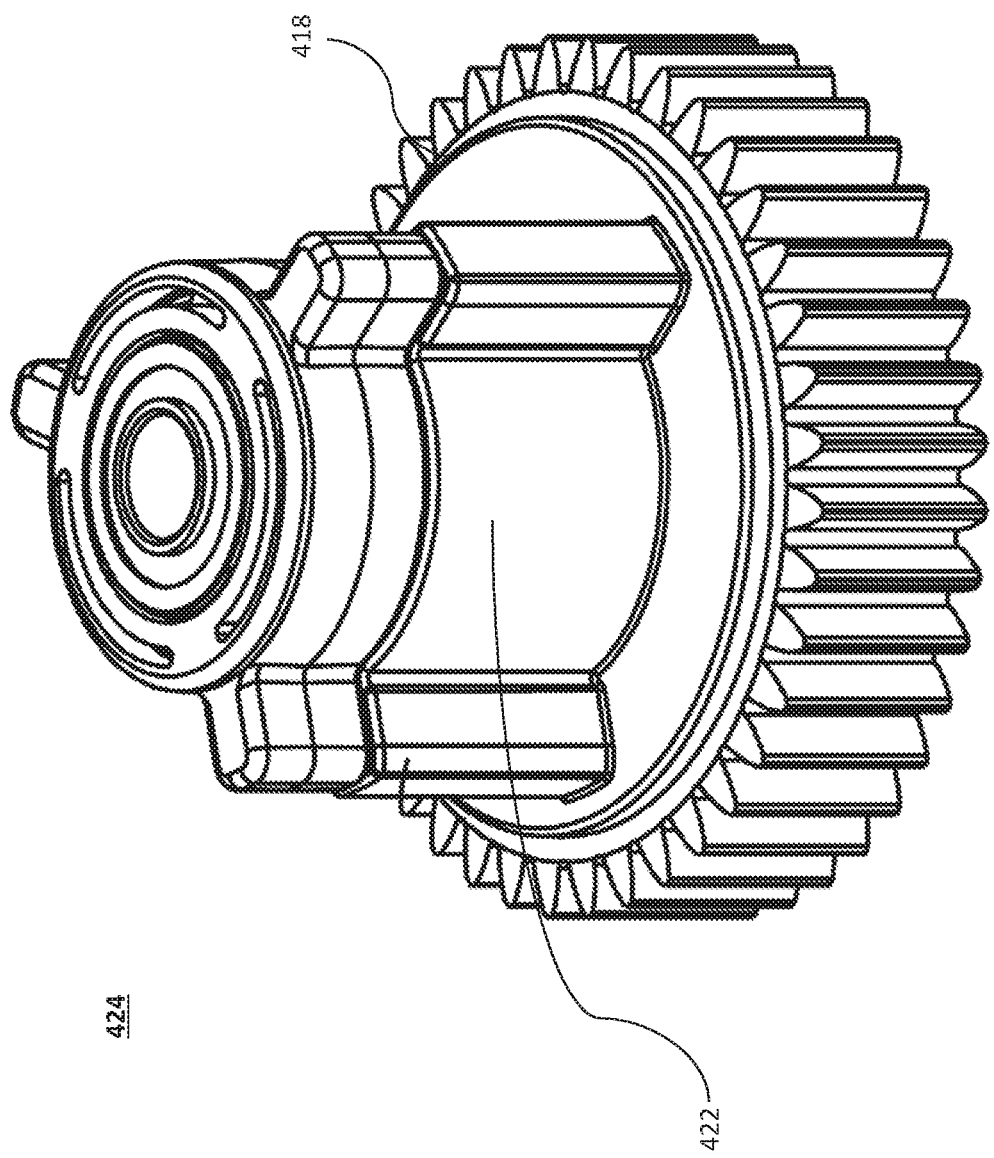

WIRE FEEDER FOR WELDING

CROSS REFERENCE TO RELATED APPLICATIONS

This application is a continuation-in-part of U.S. patent application Ser. No. 14/943,249, filed on Nov. 17, 2015, and further claims priority to U.S. Provisional Patent Application No. 62/322,933, filed on Apr. 15, 2016. Each of the forgoing applications is hereby incorporated by reference in its entirety.

BACKGROUND OF THE INVENTION

Welding is, at its core, a way of bonding two pieces of metal. Some welding processes consume wire as they are carried out. Such wire can be referred to as electrode wire, filler wire, additive wire, consumable wire, etc. Wire feeders are used in various welding or cladding applications to feed such wire to the welding or cladding spot. For example, wire feeders can provide wire to a welding gun, which in turn feeds the wire to the arc. The present disclosure generally relates to wire feeders and, more particularly, to wire feeders used in metalworking applications such as welding, cladding, and additive manufacturing applications.

In arc welding processes, such as gas metal arc welding or flux-cored arc welding, an electrode wire is used to produce the weld. An arc created between the electrode and the base metal of the workpiece is used to melt a portion of the workpiece to form a molten puddle that, when solidified, creates a weld. In such cases, the wire is fed into or near the puddle. In tungsten inert gas (TIG) welding, for example, the wire is fed to the TIG arc. This way, when a workpiece is moved relative to the welding arrangement (with either the workpiece moved or the welding equipment moved), the puddle can be maintained to create a continuous weld or cladding layer.

Hot wire welding/cladding is a process where a metal filler wire is resistively heated, typically, to a softened/plastic/semi-liquidus state, usually by passing an electrical current through it. This reduces the amount of added heat from another high-power energy source needed for the base metal of a work piece to which the heated wire is applied. Beneficially, the heating up the wire rids it of moisture, so when it enters the welding/cladding puddle it is relatively free of porosity, it is clean, and the quality is significantly better than cold wire. The wire is typically fed in front of or behind a high-power energy source such as a laser or plasma that further melts the wire material or the wire material along with the base metal of the work piece to produce a weld or clad.

In hot wire welding, the start of wire feeding is sequenced very precisely to prevent arcing, or overfeeding of the wire before the process can stabilize and be in a steady state. Commonly, first the wire feed is initiated. Second, the wire contacts the workpiece. Third, heating power (e.g., electrical current applied through the wire, which has some resistance) is applied to the wire. Fourth, the wire heats to a plastic/semi-liquidus phase at the weld/clad spot, namely the weld/clad puddle. Finally, feeding and sustained high-power energy heating of the wire occurs in the steady state. The use of hot wire welding, such as tungsten inert gas welding, tends to be more part-related and industry-related. For example, hot wire TIG is used extensively in the transportation and power generation industries, including shipbuilding and for rebuilding turbine shafts for large power plants. Hot wire TIG also is used in cladding very large valve welds such as those for oil industry in which welders clad the inside of the valve weld with high-performance alloys.

A wire feeder mechanism must be able to handle different materials and sizes of the weld wire to suit the workpieces to be welded and the welding operations to be performed. Typical sizes of weld wires range from approximately 0.023 inches to 0.052 inches in diameter. Typical materials for the weld wires include steel, stainless steel, and aluminum. Power can be applied to the wire at the feeder, or at the gun. Wire feeders typically have a replaceable spool of wire from which the wire being fed to the arc is unwound. One or more drive rollers grip the wire and pull the wire from the spool, pushing it through a conduit to the gun and the arc. Some wire feeders feed the wire at a constant feed rate, but other wire feeders can vary the feed rate in response to the arc length and voltage.

In a push-pull welding wire feeder, for example, the wire electrode may be fed at a constant torque. A push-pull welder includes a motor on each end of the wire electrode. That is, a motor in the wire feeder pushes the wire electrode and a motor in the wire feed gun pulls the wire electrode, thereby mitigating kinks by keeping the wire electrode taught within the welding conduit. Example welding wire feed systems including a wire feeder having a push motor and a welding torch assembly having a pull motor is provided by commonly owned U.S. Pat. No. 8,604,386 to Peter Donald Mehn et al, which is titled "Welding Wire Feeding Systems and Methods." Additionally, wire feeders can be used in additive manufacturing, sometimes referred to as 3D printing. In additive manufacturing, wire is melted to make a three-dimensional object. To that end, successive layers of melted wire are laid down under computer control. These objects can be of almost any shape or geometry, and can be produced from a 3D model or other electronic data source.

Prior weld wire feeder mechanisms work very well, and have gained widespread acceptance, however existing push-pull wire feeder employ a constant torque motor to provide a constant feed rate, which is expensive and limiting. For example, using a constant torque motor in a push-pull feeder system requires that the system be dedicated to only push-pull configurations. Therefore, existing systems with constant torque motors cannot be used in constant speed, push only mode, which is a more common form of wire electrode feeder. Thus, a need exists for improvements in the drive feed rolls of wire electrode feeder mechanisms.

BRIEF SUMMARY

This invention pertains to welding machines, and more particularly to apparatuses that feed a weld wire in electric arc welding machines, substantially as illustrated by and/or described in connection with at least one of the figures, as set forth more completely in the claims.

According to a first aspect, a wire feeder for feeding an electrode wire in a welding system comprises: a drive roller assembly, the drive roller assembly comprising a plurality of drive rollers to grip the electrode wire and to pull the electrode wire from an electrode wire source and to push the electrode wire toward a conduit; a first motor to generate a rotational force having a first torque; and a torque-managing device operatively coupled between the first motor and the drive roller assembly, wherein the torque-managing device receives the rotational force from the first motor and regulates the first torque to output a second torque to the drive roller assembly.

According to a second aspect, a wire feeder for feeding an electrode wire in a welding system comprises: a drive roller assembly, the drive roller assembly comprising a driving gear and one or more driven gears, wherein said driving gear transfers rotational movement to said one or more driven gears, each of said one or more driven gears having a hub that is sized and shaped to secure a drive roll to grip the electrode wire and to pull the electrode wire from an electrode wire source toward a conduit; a first motor to generate a rotational force having a first torque; and a torque-managing device coupled to the first motor via a first drive shaft and to the driving gear via a second drive shaft, wherein the torque-managing device receives the rotational force from the first motor and regulates the first torque to output a second torque to the driving gear.

According to a third aspect, a wire feeder for feeding an electrode wire in a welding system comprises: a drive roller assembly, the drive roller assembly comprising a driving gear and one or more driven gears, wherein said driving gear transfers rotational movement to said one or more driven gears, each of said one or more driven gears having a hub that is sized and shaped to secure a drive roll to grip the electrode wire and to pull the electrode wire from an electrode wire source toward a conduit; a first motor to generate a rotational force having a first torque; an electromagnetic tensioning device to receive the rotational force from the first motor and regulates the first torque to output a second torque to the driving gear, wherein the electromagnetic tensioning device is coupled to the first motor via a first drive shaft and to the driving gear via a second drive shaft; and control circuitry operatively coupled to said electromagnetic tensioning device, wherein the control circuitry monitors the second torque in real time and adjusts one or more parameters of the electromagnetic tensioning device in response to a deviation of the second torque from a target torque range.

According to a fourth aspect, a wire conveying mechanism comprises: a slip clutch mechanism connectable to a motor.

According to a fifth aspect, a metalworking apparatus comprises: a wire feed gun; and a wire feeder positioned to feed wire to the wire feed gun, wherein the wire feeder includes a slip clutch.

According to a sixth aspect, an apparatus comprises: a wire feed gun; a wire feeder positioned to feed wire to the wire feed gun, the wire feeder including a slip clutch that prevents feeding of the wire when the wire encounters a resistance above a threshold.

In certain aspects, the drive roller assembly comprises a driving gear and a driven gear, the torque-managing device being coupled to the driving gear.

In certain aspects, the second torque is greater than a feed torque and less than a bird nest torque.

In certain aspects, the torque-managing device is removably coupled with the first motor via a first drive shaft.

In certain aspects, the torque-managing device is removably coupled with the drive roller assembly via a second drive shaft.

In certain aspects, the torque-managing device is integrated with the drive roller assembly.

In certain aspects, the torque-managing device is removably coupled with the first motor via a drive shaft.

In certain aspects, the control circuitry sets the operational speed of the first motor as a function of a measured operational speed of a second motor positioned in a wire feed gun at a distal end of the conduit.

In certain aspects, the electrode wire source is a wire spool.

In certain aspects, the torque-managing device is a slip clutch that provides a constant torque.

In certain aspects, the torque-managing device is an electromagnetic overload protection coupling.

In certain aspects, the torque-managing device is a mechanical overload protection coupler.

In certain aspects, the torque-managing device is a friction torque limiter.

In certain aspects, the slip clutch mechanism has a threshold resistance selection mechanism via which a threshold resistance can be selected in discrete increments or along a continuum.

In certain aspects, the slip clutch is a push-type friction clutch having first and second moving parts and a shaft, the first moving part comprising a rotating disc received on the shaft and the second moving part comprising friction members mounted on a rotating member also received on the shaft.

In certain aspects, the rotating disc is fixed relative to the rotating shaft and the rotating member rotates freely relative to the rotating shaft.

In certain aspects, the second moving part includes a gear.

In certain aspects, the metalworking apparatus further comprises one or more wheels that frictionally engage with the wire to cause the wire to be conveyed, each such wheel including a gear meshed with the gear of the second moving part. For example, four wheels disposed in two wheel pairs, each wheel frictionally engaging the wire to convey the wire relative to the wheels, the wire being gripped between the wheels of each wheel pair, each wheel having a gear meshed with the gear of the second moving part.

In certain aspects, the threshold resistance selection mechanism includes a spring that applies pressure against the rotating disc of the second moving part and/or a nut threadingly received on an end of the shaft and a helical spring between the nut and the second moving part.

In certain aspects, the second moving part includes a friction pad disc to which are secured friction pads and a gear to which the friction pad disc is secured.

BRIEF DESCRIPTION OF THE DRAWINGS

The features of the present invention will best be understood from a detailed description of the invention and a preferred embodiment thereof, selected for the purposes of illustration and shown in the accompanying drawings in which:

FIGS. 4a through 4d illustrate expanded perspective views of a wire driver assembly having a torque-managing device.

FIGS. 5a and 5b illustrate example drive roller assembly arrangements.

FIG. 5c illustrates an example drive roll carrier.

DETAILED DESCRIPTION

Figure 1A:
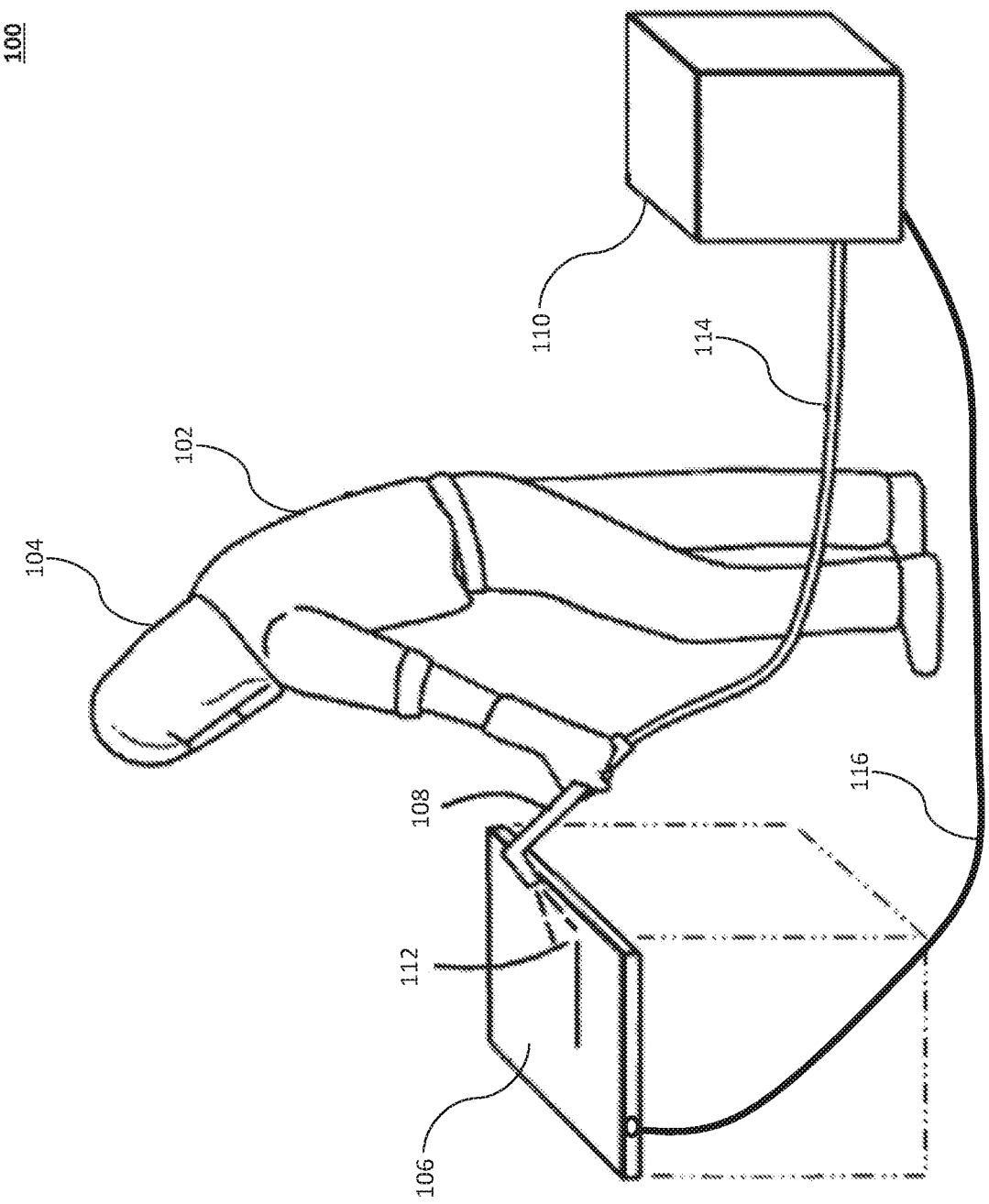
FIG. 1a illustrates an exemplary manual arc metalworking apparatus in accordance with an aspect of this disclosure.

The present disclosure is directed to systems, methods, and apparatuses that feed a welding wire electrode in electric arc welding machines, substantially as illustrated by and/or described in connection with at least one of the figures, as set forth more completely in the claims. Preferred embodiments of the present invention will be described hereinbelow with reference to the figures of the accompanying drawings. Like reference numerals are used throughout the drawings to depict like or similar elements. In the following description, well-known functions or constructions are not described in detail, since such descriptions would obscure the invention in unnecessary detail.

For the purpose of promoting an understanding of the principles of the claimed technology and presenting its currently understood best mode of operation, reference will be now made to the embodiments illustrated in the drawings and specific language will be used to describe the same. It will nevertheless be understood that no limitation of the scope of the claimed technology is intended. Further, alterations and/or further modifications to the illustrated device, and such further applications of the principles of the claimed technology as illustrated herein, are contemplated as would typically occur to one skilled in the art to which the claimed technology relates.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, the word "exemplary" means "serving as a non-limiting example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As used herein, a "high energy heat source" means a welding arc (which encompasses plasma) or a laser.

As used herein, the term "metalworking apparatus" is used to mean any welding apparatus, any cladding apparatus, any additive manufacturing apparatus, and any arc welding apparatus. A hotwire metalworking apparatus, for example, is metalworking apparatus that employs a wire that is subjected to heating prior to application of a high energy heat source.

As used herein, a "slip clutch" also means a torque limiter clutch and/or a safety clutch, as those terms are understood in the mechanical arts. In such slip clutches, a first moving part and a second moving can be frictionally engaged for cooperative movement. However, the first moving part is allowed to slip relative to the second moving part when the first moving part encounters a higher than a threshold resistance. Usually the movement is rotational movement. For consistency, the term slip clutch is used herein.

As used herein, the term "wire feed gun" means any welding gun, cladding gun, additive manufacturing gun, or the like used to guide wire to an application. The wire feed gun may emit welding shielding gas in addition to the wire. The wire feed gun is positioned downstream of a wire feeding mechanism which performs the action or actions to convey the wire.

The present disclosure describes one or more inventions relating to torque limiter or slip clutch mechanisms for wire feeders in a metalworking apparatus. For instance, a wire feeder, in accordance with the preferred embodiment, may include a motor and drive roller assembly having a torque-managing device (e.g., a slip clutch to provide a constant torque). Such mechanisms serve to reduce or end wire feeding in response to the wire fed by the feeder encountering resistance beyond a predetermined threshold. In hotwire welding, for example, this enables the wire feeding to momentarily stop or slow until the wire again softens to the point that the set torque level is no longer exceeded. In either hotwire or arc welding, momentarily stopping or slowing can prevent the coiling or bunching up of the wire and the formation of a bird's nest. As will be appreciated from the present disclosure, a torque-managing device may be integrated with, or removeably coupled with, a wire feeder drive roller assembly. The torque-managing device enables an operator to mimic a constant torque motor, such as those used in expensive push-pull feeder systems. In certain embodiments, the wire feeder may also provide a connection from the drive gear (or other components in contact with the wire electrode) to the actuator driveshaft that is electrically isolating. Thus, the drive roller assembly (including drive roll carriers) can be at one potential (i.e., electrical potential), and the motor mounting at another, without current flowing therebetween.

Referring to FIG. 1a, example metalworking apparatus 110 is shown in which an operator 102 is wearing welding headwear 104 and welding a workpiece 106 using a wire feed gun 108 (e.g., a torch) to which power is delivered by metalworking apparatus 110 via conduit 114 and work lead 116 provides the return path. The metalworking apparatus 110 may comprise a power supply, a source of an inert shield gas, and a wire feeder that automatically provides a wire electrode 314 to the wire feed gun 108 via conduit 114. The wire feeder may be internal or external to the metalworking apparatus 110, and employ a drive roller assembly to direct or guide the wire electrode 314. The metalworking apparatus 110 of FIG. 1a may be configured to form a weld joint 112 by, for example, metal inert gas welding (MIG) or TIG welding. While TIG welding need not always require external filler metal, TIG welding sometimes employs automated or semi-automated external metal filler. Optionally in any embodiment, the metalworking apparatus 110 may be arc welding equipment that provides a direct current (DC) or alternating current (AC) to a consumable wire electrode 314 of a wire feed gun 108, which may be a TIG torch, a MIG torch, or a flux cored torch (commonly called a MIG "gun").

In operation, the wire electrode 314 delivers the current to the point of welding on the work piece 106. The wire electrode 314 may be consumable. That is, it melts to become part of the weldment, thereby requiring that the wire electrode 314 be fed to the work piece 106 during a welding operation. The operator 102 (whether human or a robot) controls the location and operation of the wire electrode 314 on the work piece 106 by manipulating the wire feed gun 108 and triggering the starting and stopping of the current flow and wire feeder via, for example, a trigger positioned on the wire feed gun 108 or a control system. When current is flowing, an arc is developed between the wire electrode 314 and the work piece 106. The conduit 114 and the wire electrode 314 thus deliver current and voltage sufficient to create the electric arc between the wire electrode 314 and the work piece 106. The arc locally melts the work piece 106 and wire electrode 314 supplied to the weld joint 112 at the point of welding between wire electrode 314 and the work piece 106, thereby forming a weld joint 112 when the metal cools. An exemplary manual wire feed gun 108 generally comprises a handle, a trigger, a conductor tube, and a nozzle at the distal end of the conductor tube. Applying pressure to the trigger (i.e., actuating the trigger) initiates the welding process, whereby output power is provided, and the wire feeder, and the gas supply are activated as needed. The wire electrode 314 is feed into a nozzle or welding gun 106.

Figure 1B:
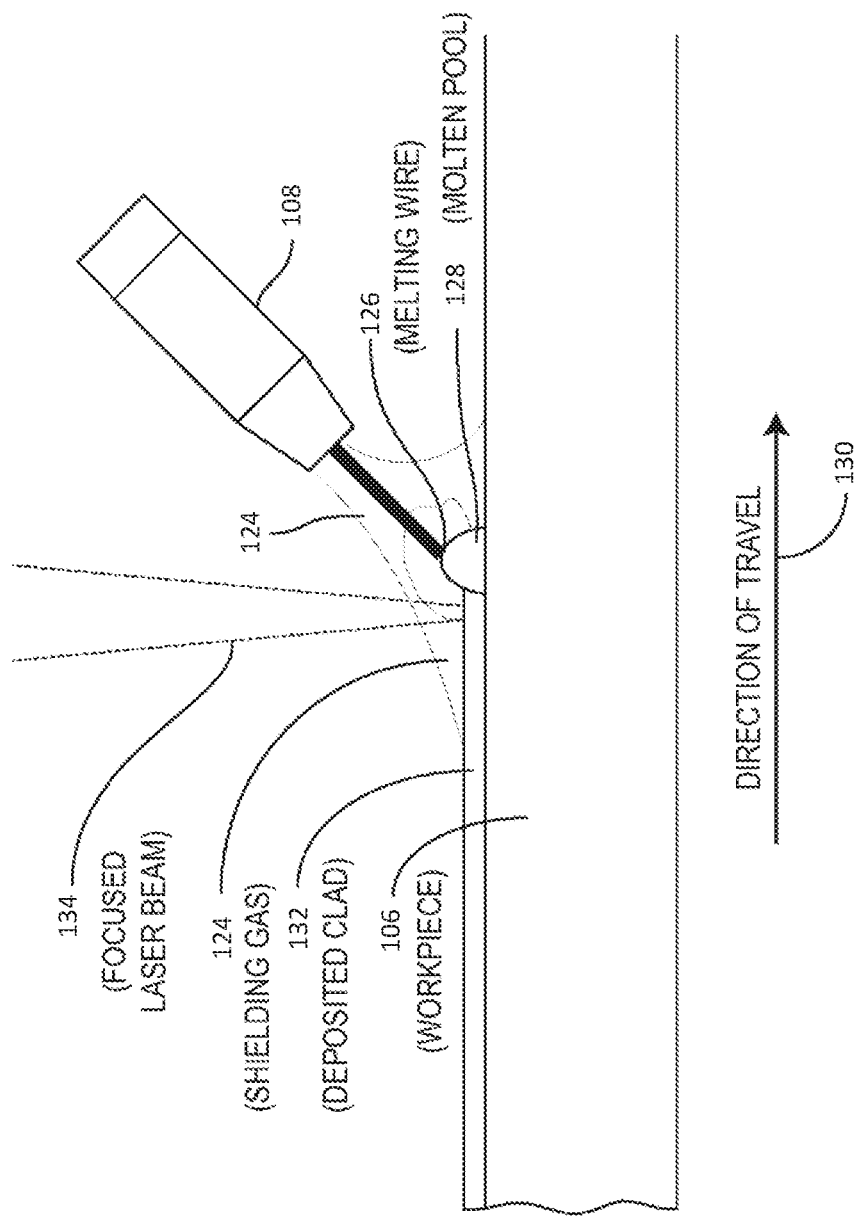
FIG. 1b illustrates in general a hotwire welding or cladding arrangement.

In FIG. 1b there is illustrated a hotwire laser welding/cladding arrangement/process in which one or more of the present inventions can be used. As illustrated, a metallic workpiece 106 and wire feeding gun 108 are positioned for relative travel between them. The workpiece 106 is representative of a base metal of any suitable workpiece. The direction of travel of the wire feeding gun 108 relative to the workpiece 106 is indicated by arrow 130. Note that the relative direction of travel is not necessarily linear. The workpiece 106 could rotate about a horizontal axis, for example a pipe rotation about its cylindrical axis, or it could rotate about a vertical axis, for example, a wheel mounted in a horizontal plane. The workpiece might also be moved three dimensionally, as with multi-axis robotic welding. In process steady-state, wire electrode 314 is feed out of the wire feed gun 108 toward a molten pool or puddle 128. At the same time, the molten pool is subject to heating by a high energy source, in this case a focused laser beam 134, that further melts the wire electrode 314 and, if a welding process, a portion of the metallic work piece 106 (i.e., the base metal) to form the puddle 128. Since the workpiece 106 is moving relative to wire feed gun 108 and the high energy source 134, the molten metal comprised of molten wire and, if a welding process, molten workpiece metal, exiting the incidence area of the high energy source 134 cools and solidifies to form a clad layer, an additive layer, or if a welding process, a weld, 132. In this illustrative process, shielding gas 124 is also provided via the wire feed gun 108.

Figure 1C:
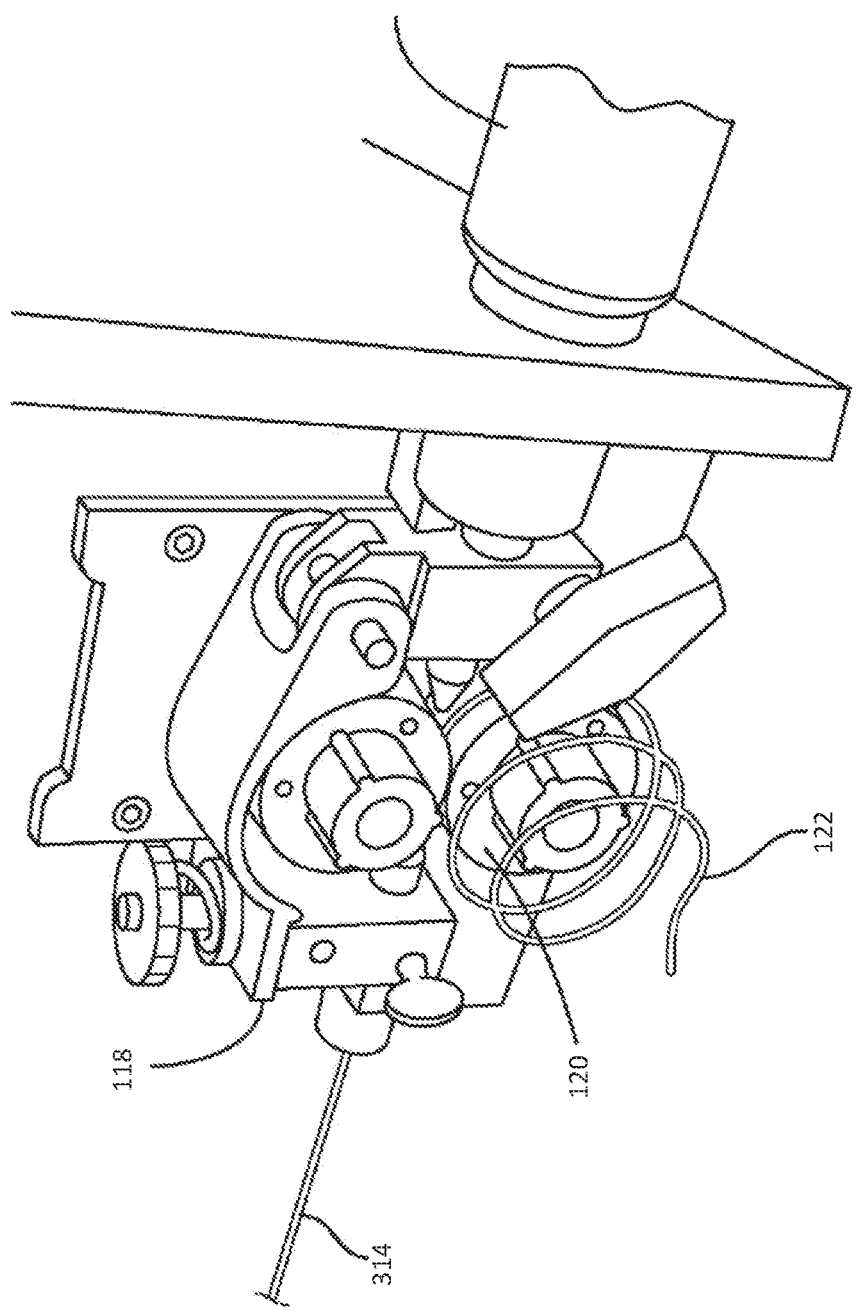
FIG. 1c illustrates, in perspective view, a wire feeder in which excessive wire has been fed by the wire feeder to result in a birds nest.

Wire electrode 314 is frictionally engaged by a drive roll pair (e.g., a pair of wheels) composed of an upper drive roll and a lower drive roll to be conveyed relative to the drive rolls. Overfeeding of wire can be problematic in many applications, and especially in welding and cladding applications. In some applications, if the wire feeding is restricted near the weld area, the wire can buckle and coil or bunch up and form a so-called bird's nest. In arc welding, for example, the wire can contact the weld spot and stick to the welding contact tip. This is called "burnback." Further, the wire can fuse to the work piece and the continuous feeding of the electrode wire will also cause the wire to bunch up and form a bird's nest. In FIG. 1c, there is illustrated, in perspective view, a wire feeder in which wire has been overfed. In this figure, the wire electrode 314 is conveyed from left to right (e.g., from a wire spool to the wire feed gun via a conduit). As illustrated, the wire electrode 314 has encountered obstruction and buckled prior to the wire feed gun 106 and formed a coil or bird's nest 122.

Figure 2:
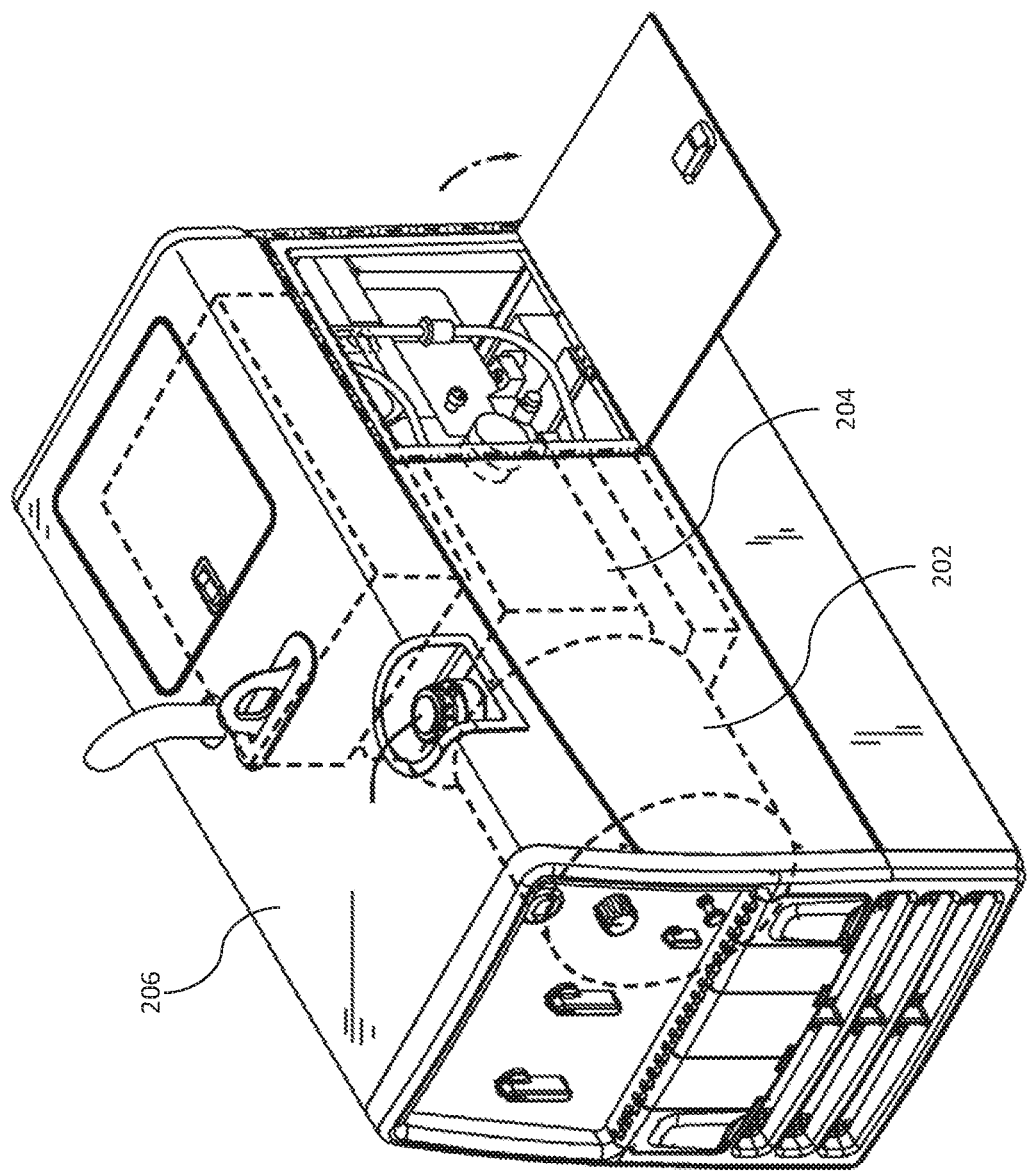
FIG. 2 illustrates portable engine-driven welding equipment having a generator drivingly coupled to an engine in a single enclosure.

FIG. 2 illustrates a portable engine-driven metalworking apparatus 110 having a generator 202 drivingly coupled to an engine 204 in a single enclosure 206. While the engine-driven metalworking apparatus 110 of the subject is described as being portable and configured within a single enclosure 206, the subject teachings shall not be limited to portable engine-driven power supplies, but rather, may be applied to stationary and/or larger engine-driven power supplies, such as those that are used in connection with robotic arc welding systems.

The single enclosure 206 may include multiple functionalities in one portable system to improve productivity and reduce space consumption. Specifically, the metalworking apparatus 110 is configured to output electrical power for a variety of applications, including welding, cutting, battery charging, jump starting, and so forth. Moreover, the metalworking apparatus 110 includes a processor and associated intelligence (e.g., logic in software and/or hardware) to adjust the outputs based on various feedback to the metalworking apparatus 110 and an external device receiving the electrical power from the power supply module, such as an engine 204. For example, the metalworking apparatus 110 does not randomly provide output power for welding and/or charging, but rather the metalworking apparatus 110 analyzes various parameters, executes various logic, and intakes sensed feedback to make an intelligent decision regarding the output. Similarly, the metalworking apparatus 110 may adjust gas flow, wire feed, and so forth, to a wire feed gun 108. For instance, as will be described, the metalworking apparatus 110 may monitor the torque at the wire feeder assembly 302. To that end, the control panel includes operator input or interface devices, such as a knob that the operator may use to adjust welding parameters (e.g., voltage, current, torque, wire speed, etc.).

Figure 3A:
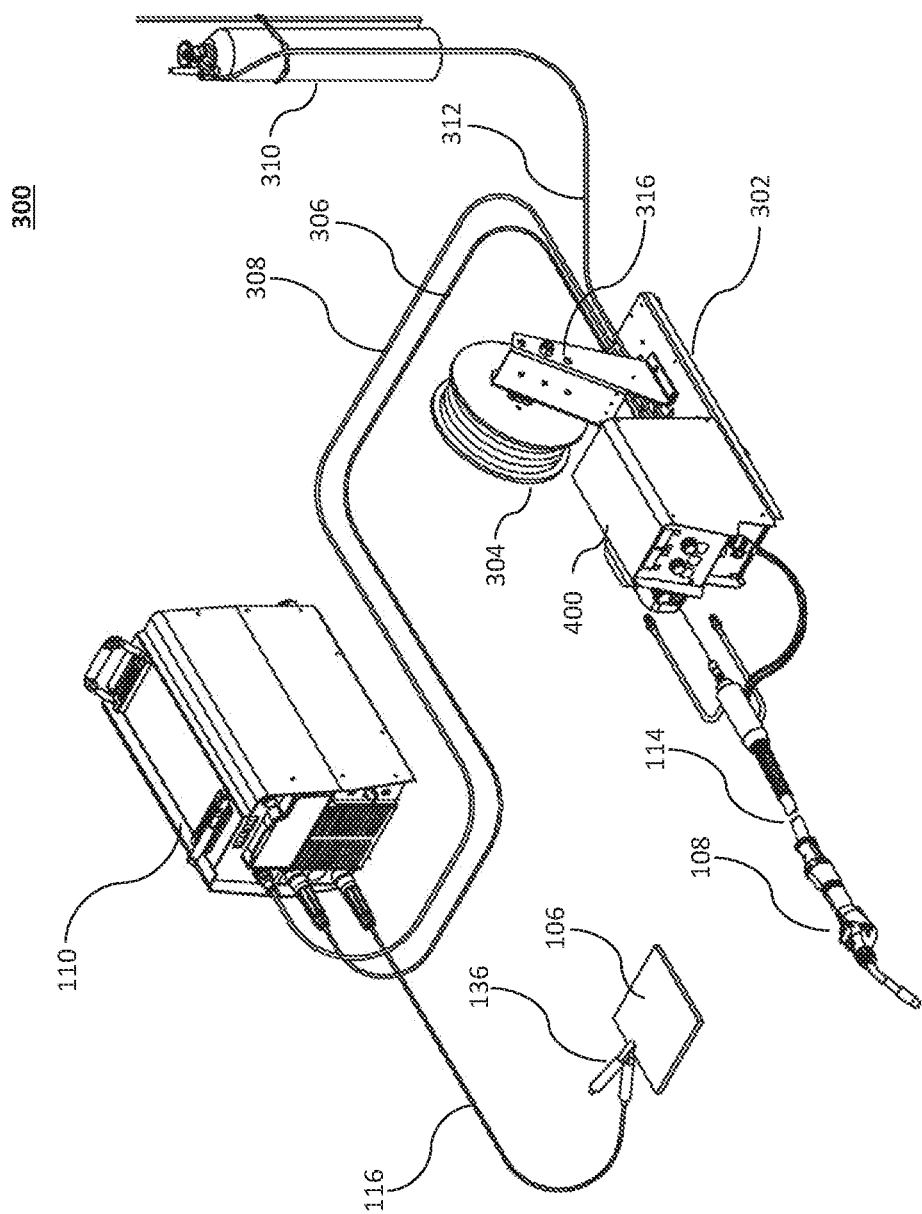
FIG. 3a illustrates an exemplary metalworking apparatus employing a bench-style wire feeder assembly.

FIG. 3a illustrates an exemplary welding system 300 that powers, controls, and provides supplies (e.g., wire electrode 314 and/or shielding gas) to a welding operation. The welding system 300 includes metalworking apparatus 110 having a control panel through which a welding operator may control the supply of welding materials. Commonly owned U.S. Patent Publication Nos. 2014/0061178 to Matiash et al., 2013/00327754 to Salsich, and 2008/00217313 to Huismann, for example and without limitation, disclose some suitable wire feeding techniques and devices that may be adapted for use with a wire feeder assembly 302 in accordance with the present disclosure.

In the illustrated embodiment, a variety of cables couple the components of the welding system 300 together to facilitate the supply of welding materials and power to the wire feed gun 108. For example, a bundle of cables couple the metalworking apparatus 110 to the wire feeder assembly 302 and provides weld materials for use in the welding operation. The bundle may include a power lead 306 and a control cable 308. Conduit 114 couples the wire feed gun 108 to the wire feeder assembly 302. A work lead 116 couples the metalworking apparatus 110 to a work clamp 136 that connects to a workpiece 106, thereby completing the circuit between the metalworking apparatus 110 and the wire feed gun 108 during a welding operation. It should be noted that the bundle of cables need not be bundled together in some embodiments and/or may include additional data, power, or other suitable leads. Further, a gas cylinder 310, which is the source of the gas that supplies the wire feed gun 108, is coupled to the wire feeder assembly 302 via gas conduit 312. The illustrated welding system 300 illustrates a bench-style wire feeder assembly 302 that provides a wire electrode 314 to the wire feed gun 108 via the conduit 114. The wire feeder assembly 302 may comprise, for example, a wire spool 304, a mounting structure 316, and a wire driver assembly 400. While a bench-style wire feeder assembly 302 is illustrated as external to the metalworking apparatus 110, as will be discussed with regard to FIG. 3b, a variation thereof may be integrated with (e.g., internal to) the single enclosure 206 without departing from the scope of the invention.

As illustrated in FIG. 3a, a wire spool 304 is configured to hold a spool of wire electrode 314, while the wire driver assembly 400 is configured to draw in (e.g., pull or otherwise convey) the wire electrode 314 off the wire spool 304 using a drive roller assembly 402, thereby causing the wire spool 304 to rotate about its center axis. The wire driver assembly 400 also pushes the wire electrode 314 through conduit 114 using the drive roller assembly 402. The wire feeder assembly 302 may further comprise control circuitry for controlling the rate and/or torque at which the wire driver assembly 400 unspools and delivers the wire electrode 314, thereby establishing a controlled feed of wire electrode 314 to the wire feed gun 108 (e.g., via conduit 114). The bench-style wire feeder assembly 302 may also include a control panel, which may be separate from the control panel of the metalworking apparatus 110, that allows the operator to set one or more wire feed parameters, such as wire feed speed and wire feed torque. In another embodiment, the bench-style wire feeder assembly 302 may receive control signals from another device, such as the metalworking apparatus 110.

The wire feeder assembly 302 may house a variety of internal components, such as an actuator 404, a drive roller assembly 402 having one or more drive rollers, and so forth. The wire feeder assembly 302 is configured to cooperate to unspool the wire electrode 314 from the wire spool 304 in a desired manner as appropriate for the given welding operation. The actuator 404 may be, for example, an electric motor. It should be noted that, the wire feeder assembly 302 may be any suitable wire feeder system, such as any of a variety of push-pull wire feeder systems, configured to utilize two or more motors to establish a wire electrode 314 feed to a wire feed gun 108. Thus, the wire feed gun 108 may house a pull motor (or other actuator) to establish a wire feed rate to the welding operation, and the wire electrode 314 feeder assembly 302 may house a push motor to draw the desired amount of wire electrode 314 from the welding spool 302, while maintaining an appropriate wire electrode 314 tension between the pull motor and the actuator 404.

In other words, a push-pull wire feeder system employs a push wire driver assembly and a pull wire driver assembly, which are located at opposite ends of the conduit 114. The push wire driver assembly is generally positioned on the metalworking apparatus 110 side of the conduit 114 and, when driven forward, pulls the electrode from an electrode wire source (e.g., a spool) and pushes the wire electrode 314 through the conduit 114. The pull wire driver assembly is generally on the wire feed gun 108 side of the conduit 114 (e.g., integrated with the wire feed gun 108) and, when driven forward, pulls the wire electrode 314 through the conduit 114. When the push-pull wire feeder system is driven in reverse, the directions of wire electrode travel are reversed such that the push wire driver assembly pulls and the pull wire driver assembly pushes (or simply becomes neutral or un-driven/disengaged). Accordingly, the actuator 404 can operate as either a push or pull motor, depending on the direction the wire electrode 314 is driven through the conduit 114. For example, when operating as a push motor, the electric motor draws the wire electrode 314 from the wire spool 304 and pushes it through the conduit 114 toward the wire feed gun 108.

The actuator 404 may be controlled based on a control signal from the control circuitry. The control circuitry may be configured to monitor a detected current, torque, and/or speed and to alter one or more control parameters of the actuator 404 (e.g., speed/torque) to maintain an operating speed of the wire electrode 314 at a substantially fixed value (as determined by a received input command). The control circuitry may calculate or determine the wire speed and/or amount of wire remaining to the control circuitry. Thus, in one embodiment, the actuator 404 may be coupled to, for example, a current sensor and/or a speed sensor. The wire feeder assembly 302 may further comprise circuitry and/or mechanical components for measuring the wire speed and/or torque, such that reported speed or torque is an actual speed or torque, and not simply an expected value based on calibration, thereby providing increased reliability.

In a push-pull feeder system, the pull motor and the push motor cooperate to maintain the desired wire feed rate from the wire spool 304 to the welding operation via the wire feed gun 108. This involves managing both the speed and torque of the motors. For example, the motors may be controlled by a single control circuit (or by plural control circuits) that synchronizes the speed of the actuator 404 and the pull motor. That is, feedback regarding the operational speed of one the motors may be utilized by control circuitry as the speed command for the other motor. In such a way, the wire feed rate may be controlled by synchronizing the speeds of the motors. Further, such a feature may reduce or prevent the likelihood of the welding electrode being deformed during the wire feeding process due to variations in motor operation. With regard to torque management, one technique used to manage the torque provided by the push wire driver assembly is to use a constant torque motor; however constant torque motors are expensive. Moreover, an existing system without a constant torque motor could not be operated as a push-pull feeder system without replacing the existing motor with a constant torque motor, which is both costly and time consuming. To overcome these issues, however, a torque-managing device 406 may be integrated with the push wire driver assembly's drive roller assembly 402 (or actuator 404), so as to mimic a constant torque motor. For example, a torque-managing device 406 may be operatively coupled between the actuator 404 and the drive roller assembly 402 or, where applicable, at a drive roll carrier 424 of the drive roller assembly 402.

Figure 3B:
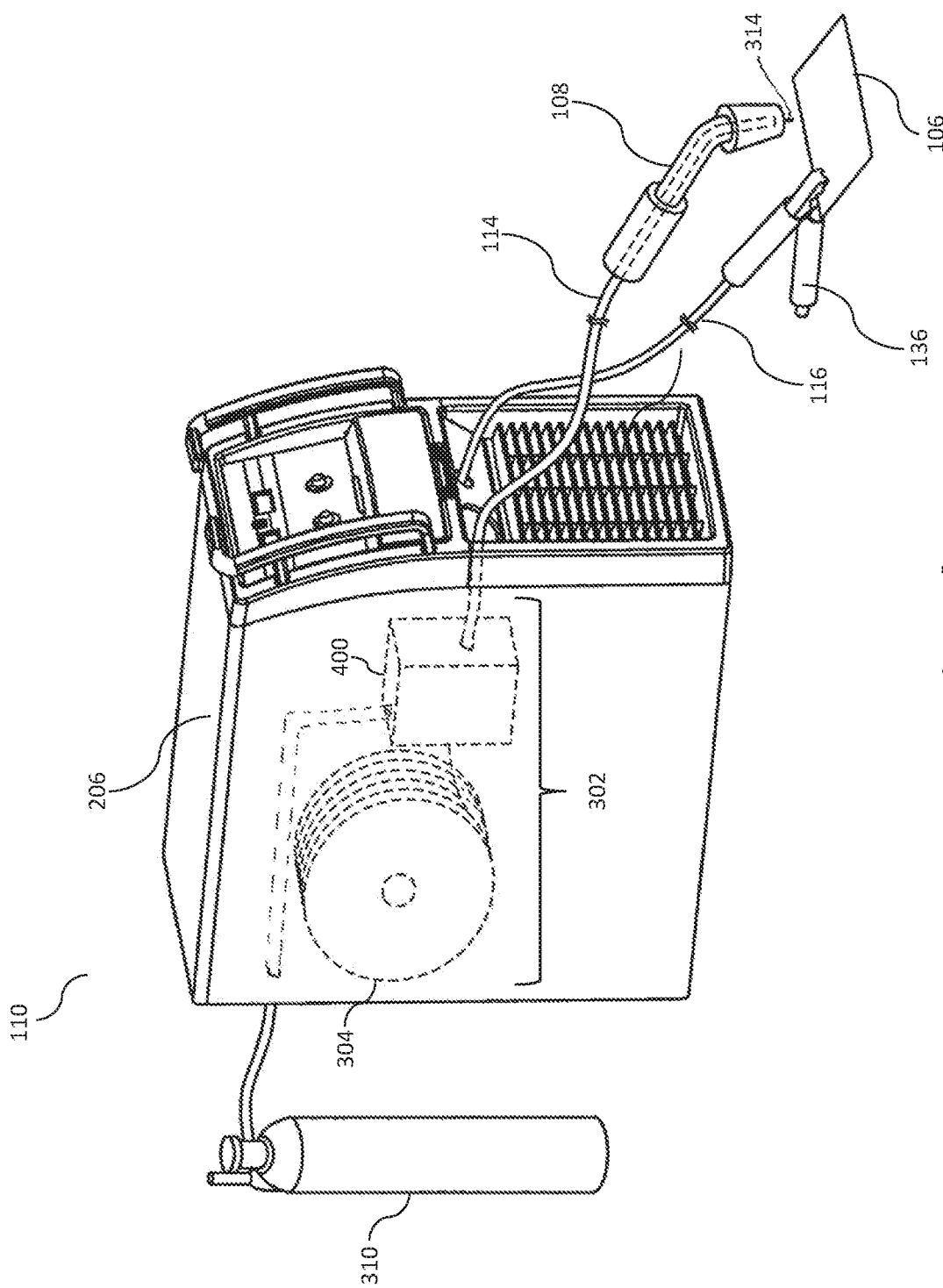
FIG. 3b illustrates a wire feeder assembly and welding equipment contained within a single enclosure.

As illustrated in FIG. 3b, the wire feeder assembly 302 may be integrated with the metalworking apparatus 110 and contained within the single enclosure 206, thereby obviating the need for, inter alia, a separate control panel, power lead 306, and control cable 308. Indeed, embodiments of the present invention may be utilized in conjunction with bench-style feeders and/or non-bench-style feeders, such as boom mounted style feeders, portable, suitcase-style wire feeders, and internal wire feeders. An example suitcase-style wire feeder is disclosed by commonly owned U.S. Patent Publication No. 2011/0114613 to Jeffery Ray Ihde et al, which is titled "Compact Welding Wire Feeder."

Referring now to FIGS. 4a through 4d, expanded perspective views of example wire driver assemblies 400 are shown. Generally speaking, the wire driver assembly 400 is configured to push the wire electrode 314 when driven forward (e.g., during welding), and to pull the wire electrode 314 when driven in reverse. Wire driver assembly 400 includes a drive roller assembly 402, an actuator 404, and a torque-managing device 406 (e.g., torque-managing devices 406a, 406b, 406c, 406d).

Figure 4A:
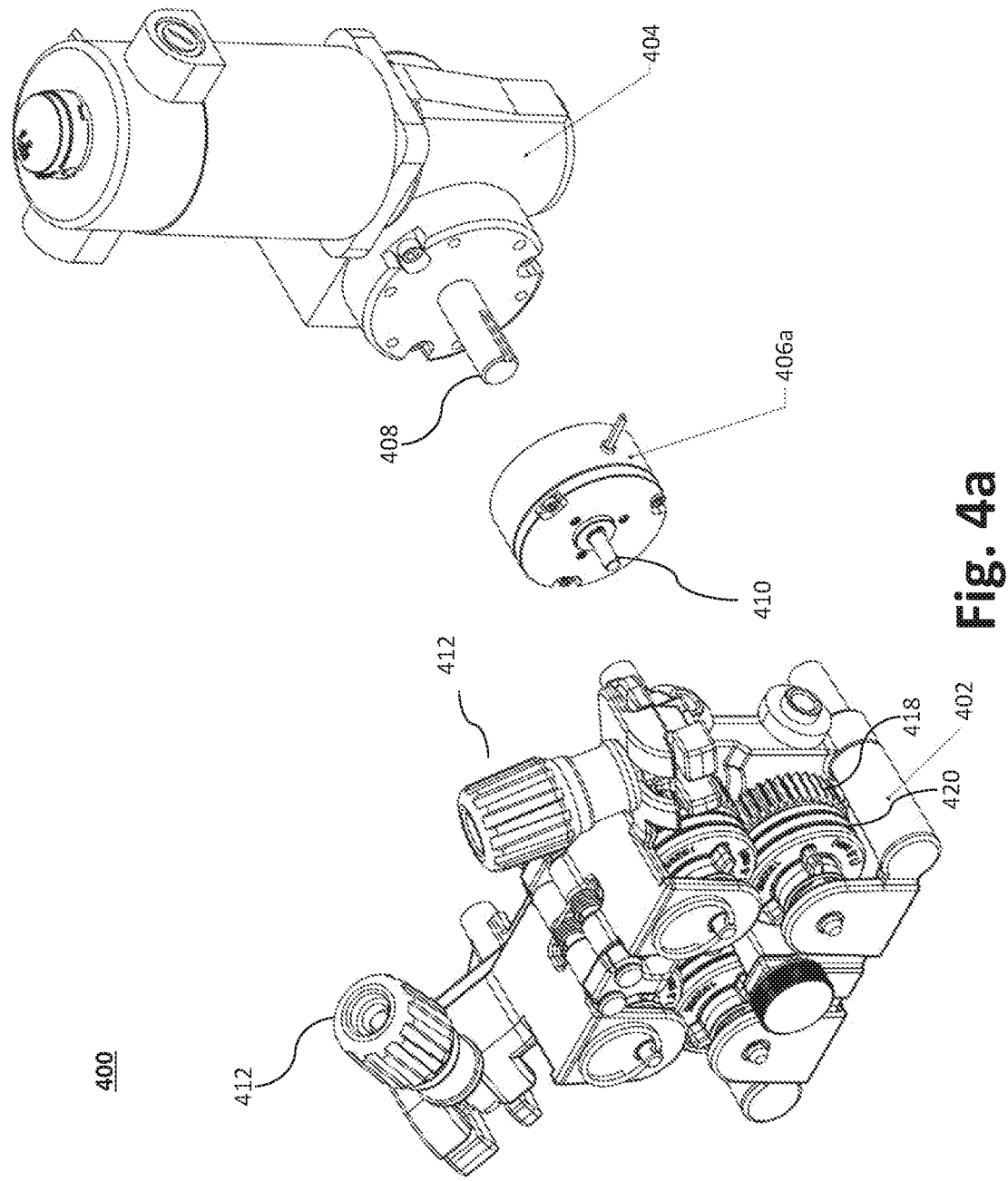

The torque-managing device 406 may be couple to, or integral with, drive roller assembly 402. That is, the wire driver assembly 400 may be fabricated with an integrated or removable torque-managing device 406, thereby enabling a user to retrofit an existing wire driver assembly 400 for use as a push-pull feeder system to create a high performing constant torque and constant speed system. A retrofit would cost significantly less money to the operator than buying the whole system. Thus, while the driveshaft 410 of FIG. 4a is illustrated as integral with the torque-managing device 406 406a, in certain aspects, such as those illustrated with regard to FIGS. 4b through 4d, the driveshaft 410 may be a removable/interchangeable adapter, thereby enabling the operator to readily retrofit existing wire driver assemblies 400, regardless of connection type. As noted above, one benefit of the torque-managing device 406 is that it may be used to convert a constant speed feeder to a push-pull feeder system, which are often used for, inter alia, aluminum welding. An adapter further enables the operator to remove the torque-managing device 406 from the wire driver assembly 400 without disassembling the metalworking apparatus (e.g., electrically or pneumatically). Accordingly, the removable/interchangeable adapter provides a much simpler arrangement conducive to alternating between a push-pull system and a pull system, thereby enabling the operator to switch modes of operation on the fly.

Figure 4B:
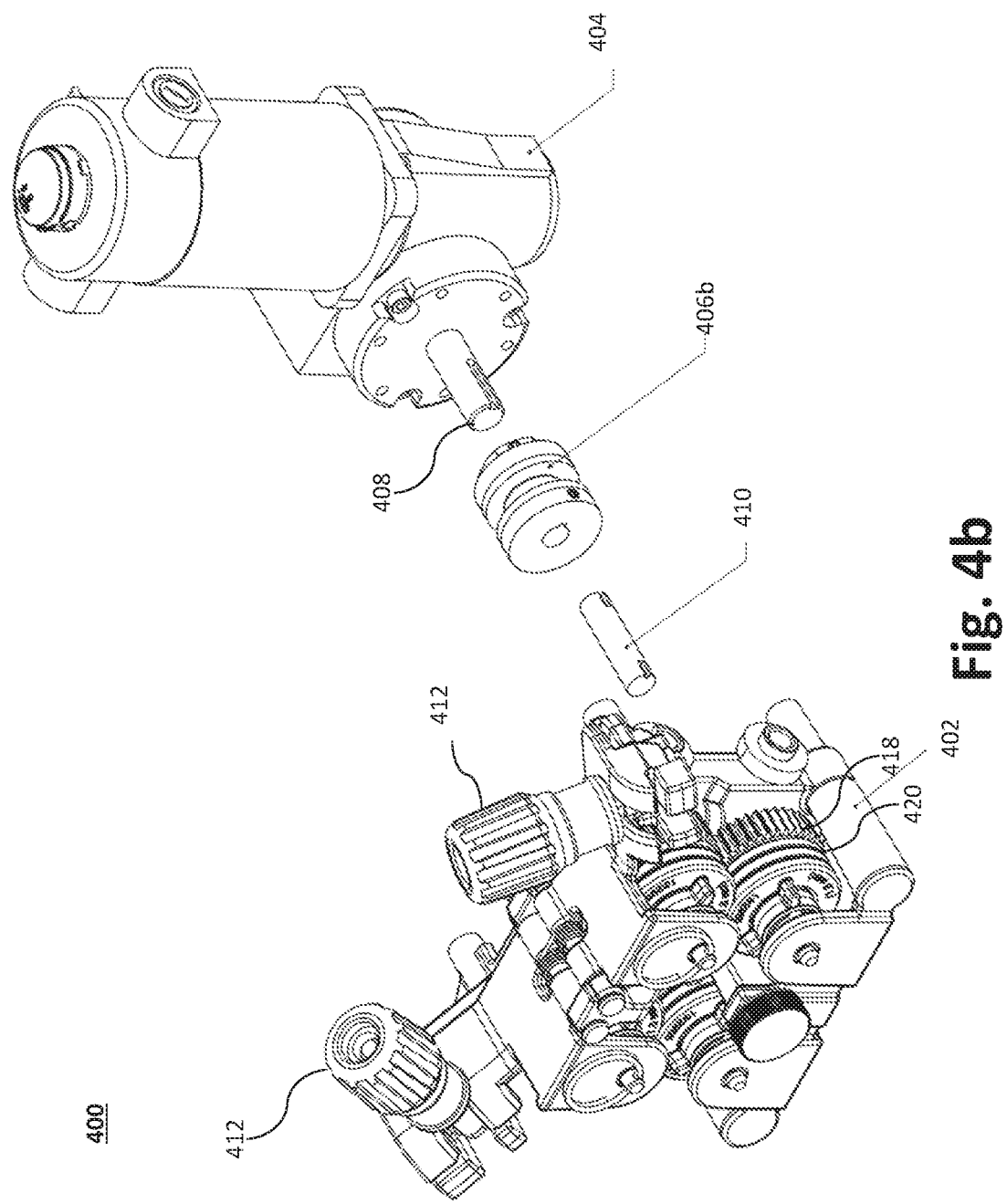
Figure 4C:
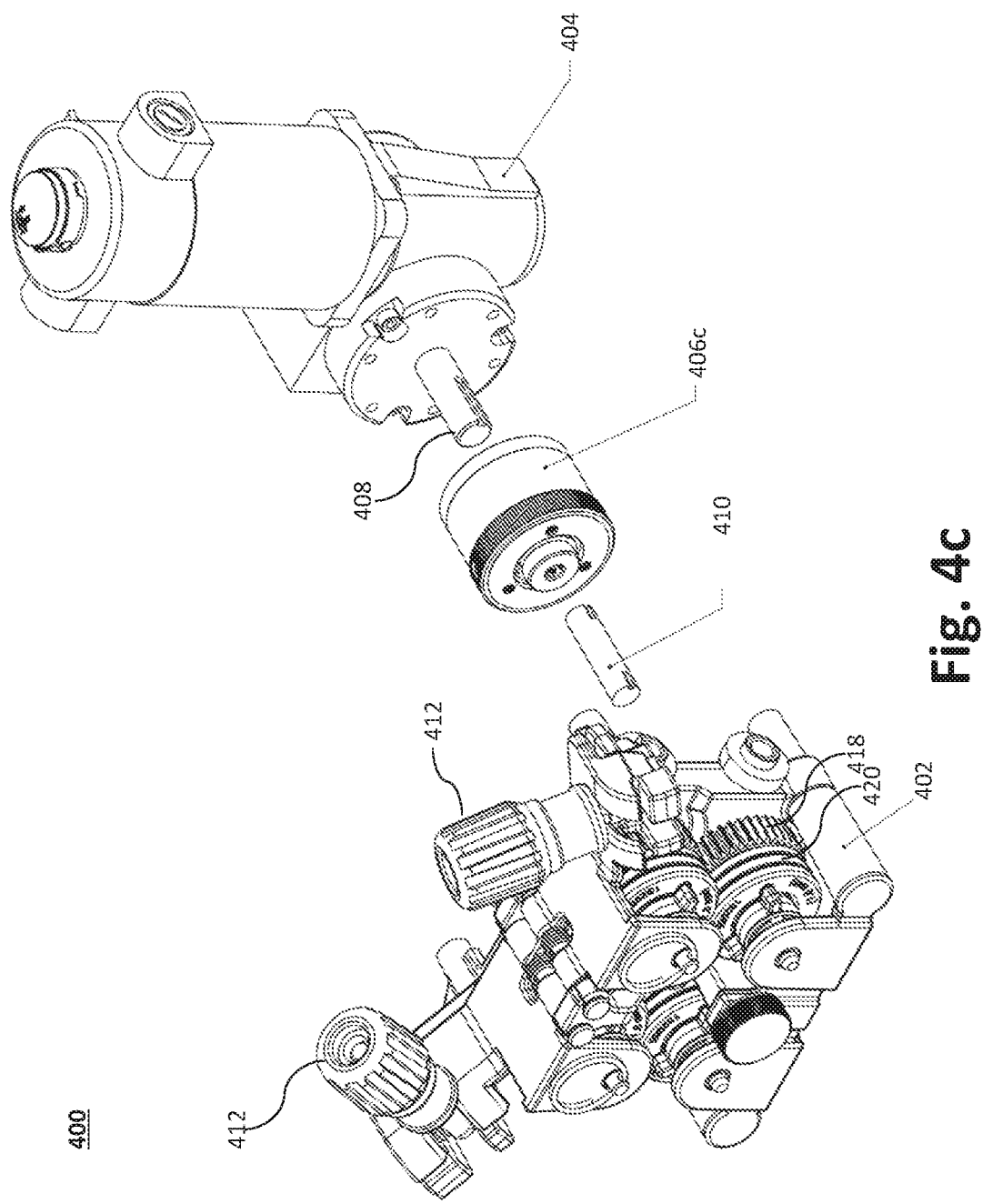

Various types of torque-managing device 406s are contemplated. As illustrated in FIG. 4a, for example, an electromagnetic tensioning device 406a, such as an electric hysteresis brake, may be used. An electric hysteresis brake uses magnetic force to create drag, which may be adjusted through an electronic control scheme. In other words, an electric hysteresis brake slows or stops motion using a variable electromagnetic force to apply mechanical resistance in the form of friction. Another option, which is illustrated in FIG. 4b, may be to provide an electromagnetic overload protection coupling 406b, which could be electronically adjusted or disengaged to avoid physically removing it from the system. An electromagnetic overload protection coupling 406b may be a metal disk type coupling with high torsional rigidity. As illustrated in FIGS. 4c and 4d, other options include, for example, a mechanical overload protection coupler 406c and/or a friction torque limiter 406d. Finally, as illustrated in FIG. 4e, a slip clutch mechanism may be employed. These options, however, may not be electronically removable or controlled. While some variations would need to be physically removed or added to the system, they could provide a cheaper option and would allow for a simplified field option. The forgoing list of torque-managing devices is not limiting and other mechanical or electromagnetic actuated type clutches and brakes may be employed.

The drive roller assembly 402 comprises a plurality of gears, including one or more driving gears 416 and driven gears 418. In operation, the driving gear 416 engages the one or more driven gears 418, thereby transferring rotational movement from the actuator 404 (via the torque-managing device 406) to the driven gears 418. To that end, the torque-managing device 406 may be shaped to receive actuator driveshaft 408 (e.g., via a bore), while the drive roller assembly 402 similarly includes a bore 414 shaped to receive driveshaft 410 from the torque-managing device 406. For instance, the driving gear 416 may be provided with a bore 414 positioned at the approximate center of the driving gear 416 to engage the driveshaft 410. Each driven gear 418 (and in some cases, the driving gear 416) may be further configured with a hub 422 that is sized and shaped to secure a drive roll 420, thereby defining a drive roll carrier 424 as illustrated in FIG. 5c. For example, the drive roll carrier 424 of FIG. 5c may be coupled to a drive roll 420 by fitting the drive roll 420 over the hub 422. The drive roll 420 engages the wire electrode 314 as it is passed (or fed) through the drive roller assembly 402.

A number of drive roller assembly 402 arrangements are contemplated. In FIG. 5a there is illustrated, in side view, a wire feeding mechanism 402 suitable for feeding the wire electrode 314 through the wire feed gun 108. As illustrated, for example, the drive roller assembly 402 may comprise one driving gear 416 and four driven gears 418 (each having a drive roll 420). In the drive roller assembly 402 of FIG. 5a, there are provided upper drive roller assemblies 424a and lower drive roller assemblies 424b. Each upper drive roller assembly 424a is paired with a lower drive roller assembly 424b (e.g., a vertically aligned drive roller assembly) to form two drive roller pairs. Each of the two drive roller pairs frictionally engages the wire electrode 314 to convey the wire electrode 314 between the upper drive roller assembly 424a and corresponding lower drive roller assembly 424b. In this figure, the wire electrode 314 is fed from right to left. As can be seen, the drive roller assemblies 424 are provided with gears 418. The gears 418 are intermeshed so that driving of lower drive roller assembly 424b also drives upper drive roller assembly 424a in the known way. Positioned between lower drive roller assemblies 424b is a drive gear 416, which is intermeshed with the lower drive roller assemblies 424b in the known way.

Alternatively, as illustrated in FIG. 5b, the drive roller assembly 402 may comprise one driving gear 416 and one driven gear 418. The driving gear 416 and driven gear 418 are intermeshed so that driving of the driving gear 416 also drives one driven gear 418 in the known way. Other configurations are contemplated, however, including drive roller assembly 402 configurations with one driving gear 416 and two driven gears 418, one driving gear 416 and three driven gears 418, etc. The wire driver assembly 400 may further comprise one or more mounting plates, which may further provide electrical isolation between the drive roller assembly 402 and the actuator 404. For example, as described with regard to U.S. Pub. No. 2014/0061178, the one or more mounting plates may be fabricated from hard plastic or other electrically insulating material.

In certain aspects, the actuator driveshaft 408 and/or driveshaft 410 may be keyed, whereby the inside of the slip clutch and drive roller assembly 402's gearing is shaped with a matching key. Matching keys, as used herein, are the two parts of a key such as on a shaft and a hub receiving the shaft. A common shaft and key may be used, such as a ½ inch shaft with a ⅛ inch key. Thus, any motor with this common key and shaft can be easily used with wire driver assembly 400. A pair of wire tensioners 412, a button spring, and a lock can operate consistent with the prior art.

A suitable drive roll carrier 424 for a welding wire feeder is illustrated in FIG. 5c and further described by, inter alia, commonly owned U.S. Patent Pub. No. 2014/0054349, to Lahti, which is incorporated herein by reference. FIG. 5c illustrates a drive roll carrier 424 having a gear 418 that is driven to rotate by engagement of teeth of the gear with a cooperating gear (e.g., driving gear 416, driven gear 418, etc.) of the drive roller assembly's 402 gear train. As illustrated, and noted above, a hub 422 extends from the outwardly facing surface of the gear 418. The hub 422 is arranged with respect to the gear 418 so that rotation of the gear 418 is translated into rotation of the hub 422. An outer end of the hub 422 is spaced from the gear 418 and is configured to receive the drive roll 420 when mounting the drive roll 420 upon the drive roll carrier 424. For instance, a wire feeder assembly 302 may include an actuator 404 with a speed reducing gear drive and the slip clutch. A bore of a drive roll carrier 424 fits over an output shaft of the speed reducer, which is limited by the slip clutch. The drive roll carrier 424 may have one or more outer circumferential grooves sized to suit a particular diameter weld wire electrode 314.

Figure 6:
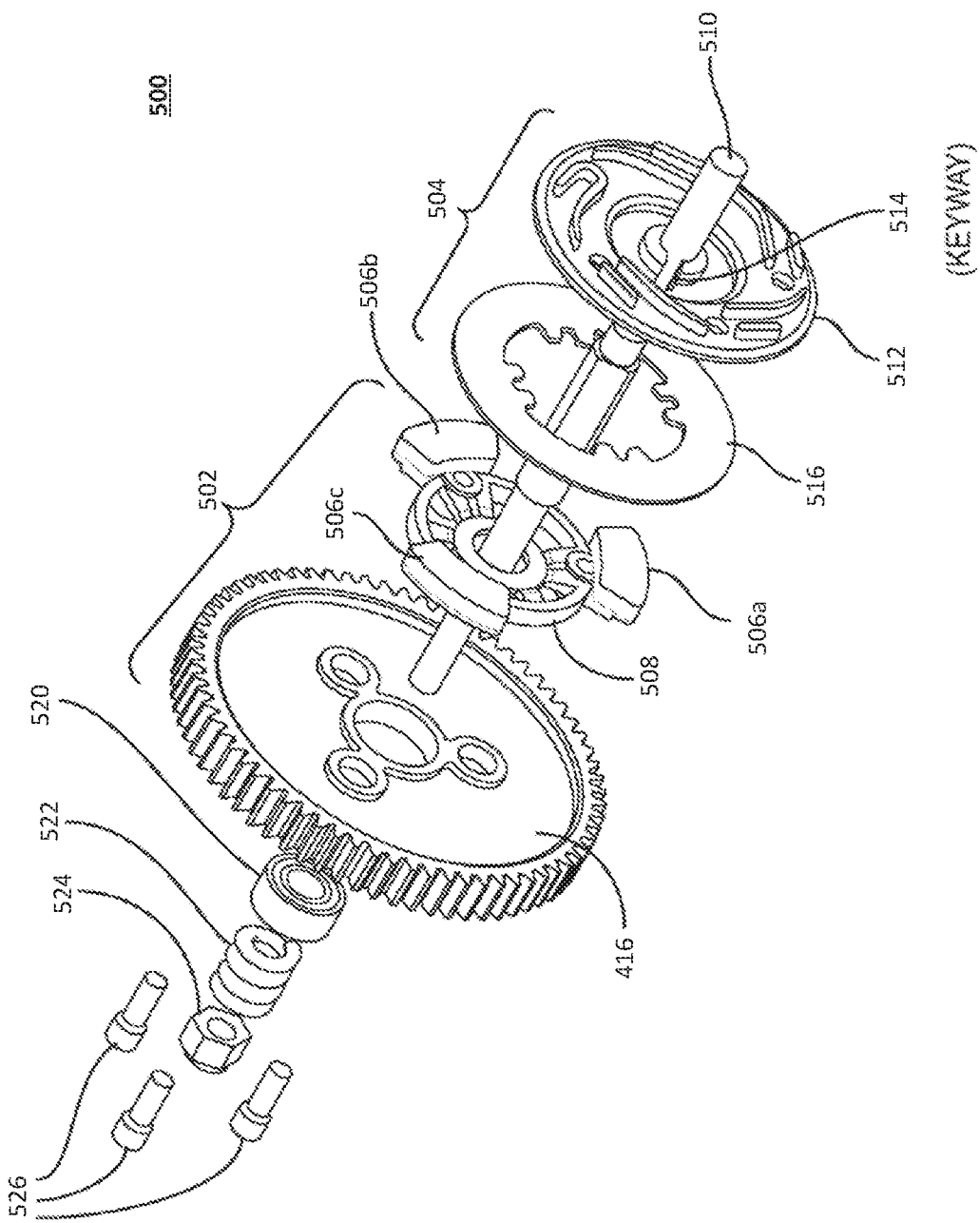
FIG. 6 illustrates, in exploded view, a slip clutch mechanism for use in a wire feeder.

In certain aspects, the torque-managing device 406 may be integrated with the driving gear 416 in the form of a slip clutch mechanism 500. In FIG. 6, for example, a slip clutch mechanism 500 including the driving gear 416 is provided. In operation, the slip clutch mechanism 500 receives a rotational force from the actuator 404 and translates the rotational force to the drive roller assembly 402 via the teeth of driving gear 416 at the same, or different, torque (e.g., using a slip clutch). As illustrated, the slip clutch mechanism 500 includes a rotating shaft 510 that is driven by the actuator 404. Secured to the rotating shaft 510 is a first moving part 504 that includes a driving disc 512 that includes a keyway 514 to accommodate a key on the shaft 510 so that the driving disc 512 rotates with the shaft 510. A slip surface disc or pressure plate 516 is positioned against the driving disc 512 for rotation therewith due to an inner periphery profile that mates with a raised profile on the driving disc 512. The specifics of the way in which the discs 516 and 512 engage each other, if at all, are not material, so long as an appropriate or sufficient slip or pressure surface facing a second moving part 502, described below, is provided. The second moving part 502, the components of which are described below, is also received on the rotating shaft 42. However, the second moving part 502 is not secured to the shaft 42 and is free to rotate relative to the shaft 42. The second moving part 502 includes the driving gear 416. Secured to the driving gear 416 is a clutch pad part 508 that includes three friction material shoes or pads 506a-506c mounted on brackets 58a-58c, respectively. The clutch pad part 508 is secured to the driving gear 416 by means of three bolts 526. The clutch shoes/pads 506a-506c face the slip/pressure surface of the slip surface disc 516.

The driving gear 416 is received on one end of the shaft 510 but does not include any keying arrangement so that it is free to rotate relative to the shaft 510. The driving gear 416 is held on the shaft 510 by means of a nut 524. Between the nut 524 and the driving gear 416 is a pressure spring 522 and bearing 520. By adjusting the nut 524 it is possible to adjust the amount of pressure of the shoes/pads 506a-506c against the slip surface. As can be appreciated, with less pressure, the shoes/pads 506a-506c will experience less friction on the slip/pressure surface, and thus be able to slip relative to the slip surface. In turn, the driving gear 416 will slip relative to the rotation of the shaft 510. Conversely, suitable tightening of the nut 524 will cause the spring 522 to exert more pressure against the bearing 520 and the driving gear 416, so that the shoes/pads 506a-506c in turn exert more pressure against the slip/pressure surface. Thus, the pads 506a-506c will experience greater friction and be caused slip less relative to the slip/pressure surface, and therefore the driving gear 416 will be caused to rotate more in concert with the rotation of the shaft 510.

The foregoing slip clutch mechanism 500 uses what is referred to as an axial pressure plate mechanism or a push type mechanism. Alternatively, a radial pressure plate mechanism or centrifugal clutch mechanism might be used in which friction pads are positioned in a flywheel mechanism on a driving rotating part so with increasing rotation and centrifugal force, the pads exert increasing radial force. Such types of clutches are well known and come in many designs. Also, the slip/pressure surface is a cylindrical surface on the driven rotating part within which the friction pads rotate, as would be understood by those of ordinary skill in this art. The pressure of the pads would be adjustable by known adjustment mechanisms that would impede or facilitate the ability of the pads to extend radially due to rotation of the shaft. Other clutches use radial spring pressure to the same effect. Regardless of the type of slip clutching mechanism, the pressure or resistance needed for the friction pads to not slip is a function of, among other things, the size of the wire, and the material of which the wire is made. Thinner wire, which tends to be flimsier, requires less pressure to feed it through the feeding assembly. Similarly, softer metals require more delicate handling and thus lower pressures to feed it through the feeding assembly.

It can be appreciated that the above describe axial pressure adjustment mechanism provided by the nut 524 and the spring 522, is a form of a continuously variable adjustment mechanism in that the nut can be tightened or loosening at virtually, if not actually, infinite positions along a continuum between completely disengaged to fully tightened. However, other mechanisms that can be used include incremental adjustment mechanisms in which the tightening unit includes discrete positions. An example is a spring loaded nut with detents (e.g., a detent mechanism).

In one method for determining a suitable resistance threshold for the wire, and thus the pressure for the pressure applying mechanism, as an initial set-up, the wire is fed through the feeding mechanism under cold conditions by the driving gear 416. However, the pressure is adjusted so that the clutch barely slips such that the feeding is very slow. Then the pressure is adjusted to an increased level until the desired feeding speed is reached. At this point, any further resistance encountered by the wire causes the wire to resist feeding by the wheels 424a, 424b and, in turn, the driving gear 416 to slip relative to the shaft 510.

It can be appreciated that a structure such as the foregoing enables the momentary stop of the wire by means of mechanical slippage of a clutch mechanism. However, the feed wheels maintain pressure between the wire and the work piece, but will not move the wire until it is soft enough to plastically deform, melt, and flow. It is possible to measure this resistance using a load cell or some other suitable device so that the pressure setting can be repeated by simply referring to the measured values. In a typical hotwire welding arrangement, the load of the wire will be about 20-30 pounds of force at steady state. Thus, the threshold setting for the slip clutch will typically fall within this range. At the same time, the feed rate of the wire will typically be about 400 inches per minute (IPM) at steady state. During start-up, the feed could be slow, e.g. 50 IPM. Feed speeds up to 700 IPM are also contemplated, however. Also, it typically takes about 1.0 to 1.5 seconds to reach steady state. The first 0.75 second or so is spent for the wire to heat up to the semi-liquidus state.

In certain aspects, the welding equipment's 110 control circuitry (such as those used to control the wire feeder motors) may be coupled with the torque-managing device (e.g., the slip clutch) and configured to monitor and adjust the torque (e.g., in real time). For example, the metalworking apparatus 110 or the wire feeder assembly 302 may be provided with an operator input device (e.g., knob, dial, touch screen, etc.) that enables the operator to set the desired torque (or an acceptable range). In operation, the metalworking apparatus 110 and/or wire feeder assembly 302 may monitor the torque in real time, whereby the slip clutch (e.g., the magnetic force from the electric hysteresis brake) can be adjusted to substantially maintain a targeted torque (or prevent exceeding a predetermined torque—a torque limit). In certain aspects, the targeted torque and/or the measured torque (or deviation thereof) may be displayed by the metalworking apparatus 110 or wire feeder assembly 302 (e.g., via an on-board display or through a remote monitoring station).

In operation, the targeted torque of the slip clutch may be set above the feed torque of the wire (e.g., the torque needed to drive the wire electrode 314) and below the bird nest torque, such that the slip clutch would hold during normal conditions, but would slip when a bird nest condition is approached. A mentioned and illustrated above, a bird nest condition occurs when the column of wire electrode 314 buckles between the wire driver assembly 400 and the wire feed gun 108. The buckling force can be either empirically or theoretically determined. For example, the buckling force can be theoretically predicted using Euler's buckling equation. Thus, a look-up table may be used to identify a targeted torque for a given welding operation (e.g., based on welding operation, wire electrode type, welding parameters, etc.). Other devices may be employed in addition to, or in lieu of, the slip clutch to further improve wire feed system performance. For example, wire driver assembly 400 may be operated in a non-slip mode to limit bird nests in constant voltage feeders.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims. All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A wire feeder for feeding an electrode wire in a welding system, the wire feeder comprising:
    a drive roller assembly, the drive roller assembly comprising a plurality of drive rollers to grip the electrode wire and to pull the electrode wire from an electrode wire source and to push the electrode wire toward a conduit;
    a first motor to output, via a drive shaft, a rotational force having a first torque; and
    a mechanical slip clutch having a first moving part mechanically coupled to the drive shaft and a second moving part mechanically coupled to the drive roller assembly,
        wherein the first moving part frictionally engages the second moving part in a push-type friction arrangement via a clutch pad part and a slip surface disc,
        wherein at least one of the first moving part or the second moving part is configured to rotate freely relative to the drive shaft, and
        wherein the mechanical slip clutch is configured to receive the rotational force from the drive shaft and to regulate the first torque to output a second torque to the drive roller assembly.

2. The wire feeder of claim 1, wherein the second moving part is a driving gear that is mechanically coupled to a driven gear of the drive roller assembly, wherein the driven gear is configured to drive the plurality of drive rollers at the second torque.

3. The wire feeder of claim 2, wherein the mechanical slip clutch is mechanically integrated with the driving gear of the drive roller assembly.

4. The wire feeder of claim 3, wherein the mechanical slip clutch is removably coupled with the drive shaft of the first motor.

5. The wire feeder of claim 1, wherein the second torque is greater than a feed torque and less than a bird nest torque.

6. The wire feeder of claim 1, wherein the mechanical slip clutch is removably coupled with the drive shaft of the first motor.

7. The wire feeder of claim 6, wherein the mechanical slip clutch is removably coupled with the drive roller assembly via a second drive shaft.

8. The wire feeder of claim 1, wherein control circuitry sets an operational speed of the first motor as a function of a measured operational speed of a second motor positioned in a wire feed gun located at a distal end of the conduit.

9. The wire feeder of claim 1, wherein the electrode wire source is a wire spool.

10. The wire feeder of claim 1, wherein the first moving part is fixed relative to the drive shaft.

11. The wire feeder of claim 10, wherein the second moving part is configured to rotate freely relative to the drive shaft.

12. The wire feeder of claim 1, wherein the clutch pad part comprises one or more friction pads arranged to face a pressure surface of the slip surface disc.

13. The wire feeder of claim 1, wherein the wire feeder is a bench-style wire feeder.

14. The wire feeder of claim 1, wherein the mechanical slip clutch receives the rotational force from the first motor at a constant speed and regulates the first torque to output a second torque to the drive roller assembly.

15. A wire feeder for feeding an electrode wire in a welding system, the wire feeder comprising:
    a drive roller assembly, the drive roller assembly comprising a driving gear and one or more driven gears, wherein said driving gear transfers rotational movement to said one or more driven gears, each of said one or more driven gears having a hub that is sized and shaped to secure a drive roll to grip the electrode wire and to pull the electrode wire from an electrode wire source toward a conduit;

a first motor to generate a rotational force having a first torque; and a slip clutch mechanically coupled to the first motor via a first drive shaft and to the driving gear via a second drive shaft, wherein the slip clutch includes a first moving part that is fixed relative to the first drive shaft and a second moving part that is configured to rotate freely relative to the first drive shaft, wherein the first moving part is configured to frictionally engage the second moving part in a push-type friction arrangement via a clutch pad part and a slip surface disc, and wherein the slip clutch is positioned physically between the first motor and the drive roller assembly and is configured to receive the rotational force from the first motor and to regulate the first torque to output a second torque to the driving gear.

16. The wire feeder of claim 15, further comprising control circuitry to set an operational speed of the first motor as a function of a measured operational speed of a second motor positioned in a wire feed gun at a distal end of the conduit.

17. The wire feeder of claim 15, wherein the first moving part is mechanically coupled to the first drive shaft and the second moving part is mechanically coupled to the second drive shaft.

18. The wire feeder of claim 15, further comprising an operator input device to set an operational speed of the first motor to a desired operational speed in response to an operator input.

19. A wire feeder for feeding an electrode wire in a welding system, the wire feeder comprising:

a drive roller assembly, the drive roller assembly comprising a driving gear and one or more driven gears, wherein said driving gear transfers rotational movement to said one or more driven gears, each of said one or more driven gears having a hub that is sized and shaped to secure a drive roll to grip the electrode wire and to pull the electrode wire from an electrode wire source toward a conduit;

a motor to provide, via a drive shaft, a rotational force having a first torque; and a slip clutch mechanically coupled to the drive shaft and configured to regulate the first torque to output a second torque to the driving gear, wherein the slip clutch includes a first moving part that is fixed relative to the drive shaft and a second moving part that is configured to rotate freely relative to the drive shaft, and wherein the first moving part is configured to frictionally engage the second moving part via a clutch pad part and a slip surface disc.

20. The wire feeder of claim 19, wherein the clutch pad part comprises one or more friction pads arranged to face a pressure surface of the slip surface disc.

21. The wire feeder of claim 19, wherein the first moving part is configured to frictionally engage the second moving part in a push-type friction arrangement.

22. The wire feeder of claim 19, wherein the first moving part is mechanically coupled to the drive shaft and the second moving part is mechanically coupled to the drive roller assembly.

23. The wire feeder of claim 22, wherein the second moving part is fixed relative to the driving gear.

\* \* \* \* \*